(12) United States Patent
Friedow et al.

(10) Patent No.: US 9,133,869 B2
(45) Date of Patent: Sep. 15, 2015

(54) SHIELDING DEVICE WITH A SHIELDING ELEMENT AND AT LEAST ONE TEMPERATURE AND OSCILLATION-DECOUPLED FASTENING DEVICE

(75) Inventors: Thomas Friedow, Plymouth, MI (US); Bob Bell, Brownstown, MI (US)

(73) Assignee: ELRINGKLINGER AG, Dettingen-Erms (DE)

(*) Notice: Subject to any disclaimer, the term of this patent is extended or adjusted under 35 U.S.C. 154(b) by 319 days.

(21) Appl. No.: 13/554,686

(22) Filed: Jul. 20, 2012

(65) Prior Publication Data

US 2013/0034377 A1    Feb. 7, 2013

Related U.S. Application Data

(60) Provisional application No. 61/608,822, filed on Mar. 9, 2012, provisional application No. 61/513,867, filed on Aug. 1, 2011.

(51) Int. Cl.
*F01N 1/00* (2006.01)
*F16B 5/02* (2006.01)

(52) U.S. Cl.
CPC ............. *F16B 5/0241* (2013.01); *Y10T 403/17* (2015.01)

(58) Field of Classification Search
CPC .................................. F16B 2/24; F16B 2/241
USPC ............. 403/11, 23, 203, 220, 225, 291, 372; 228/59; 181/207, 208; 267/140.12, 267/141.2, 141.3

See application file for complete search history.

(56) References Cited

U.S. PATENT DOCUMENTS

| 4,957,279 A * | 9/1990 | Thorn ...................... 267/140.11 |
| 7,065,963 B2 * | 6/2006 | Niwa .............................. 60/323 |
| 7,189,024 B2 * | 3/2007 | Cameron ...................... 403/306 |
| 7,273,128 B2 * | 9/2007 | Niwa et al. ..................... 181/207 |
| 7,284,748 B2 * | 10/2007 | Mishima .................. 267/140.11 |
| 8,104,573 B2 * | 1/2012 | Oxenknecht et al. ......... 181/210 |
| 2011/0067952 A1 | 3/2011 | Oxenknecht et al. |
| 2011/0076096 A1 * | 3/2011 | Slayne et al. ................. 403/372 |

FOREIGN PATENT DOCUMENTS

| DE | 202006013527 U1 | 1/2007 |
| DE | 202010013507 U1 | 2/2011 |
| EP | 1528231 B1 | 5/2005 |
| EP | 1548246 A2 | 6/2005 |
| WO | 2010102656 A1 | 9/2010 |

* cited by examiner

*Primary Examiner* — Michael P Ferguson (57) ABSTRACT

The invention relates to a shielding device with a shielding element and at least one fastening eyelet for fastening the shielding device to a counterpart fastening piece and for receiving a fastening element. The fastening eyelet is movably supported in a fastening opening of the shielding device. The fastening eyelet is supported by a resiliently embodied coupling device so that the fastening eyelet is resiliently supported relative to the shielding element in an axial direction and is movable in the fastening opening relative to the shielding element in at least one radial direction when acted on with friction force. To produce friction force, radially outer regions of the coupling device cooperate in a resiliently prestressed fashion with sliding zones of opposing outsides of the shielding element.

15 Claims, 5 Drawing Sheets

SECTION C-C

SHIELDING DEVICE WITH A SHIELDING ELEMENT AND AT LEAST ONE TEMPERATURE AND OSCILLATION-DECOUPLED FASTENING DEVICE

FIELD OF THE INVENTION

The invention relates to a shielding device with a shielding element and at least one temperature and oscillation-decoupled fastening device.

BACKGROUND OF THE INVENTION

A shielding device of this kind is known from WO 2010/102656 A1. This prior patent specification proposes a decoupling element in the form of a wire mesh, which has a protruding collar that reaches through a fastening opening of the shielding element. A sleeve embodied in the form of a collar-shaped sleeve is supported in this decoupling element. A screw for fastening the shielding device can be inserted through the sleeve.

The oscillation damping should be provided by the wire mesh, which acts as a buffer-like, locally compressible element; micro-movements of the shielding element relative to the fastening point (sleeve) are possible. At the same time, the wire mesh structure should ensure a reduced temperature transmission between the shielding element and a counterpart fastening piece. It is disadvantageous that the decoupling element must be compressed a certain amount during the fastening of the shielding element. This causes a wire mesh to lose its elastic compressibility. In addition, fastening devices on the shielding element are required for affixing the wire mesh to the shielding element, thus increasing manufacturing expense.

In addition, the proposed decoupling element, in particular the fastening eyelet, is not secured in captive fashion so that special steps must be taken to ensure that the decoupling element can be preinstalled in the shielding element and cannot come out of it until assembly is complete.

The object of the invention, therefore, is to disclose a shielding device decoupling element that is effective for both oscillations and heat, in particular a heat shield and/or an acoustic shielding element, which functions reliably and is simple to manufacture.

In addition, the shielding device should have a fastening device that is supported so that it can be moved freely relative to the shielding element, at least in a radial direction, merely by exerting a definite displacement force that remains constant or virtually constant within the movement range. At the same time, it should permit a fastening of the shielding element that is oscillation-decoupled and compensates for tolerances in an axial direction.

According to another stated object of the invention, a particularly preferred embodiment of the shielding device should be easily adaptable to scenarios involving stresses due to oscillation and heat at a particular fastening point of the shielding element.

SUMMARY OF THE INVENTION

The invention consequently relates to a shielding device with a shielding element that has at least one fastening device for fastening the shielding device to a counterpart fastening piece equipped with a fastening eyelet for accommodating a fastening element; the fastening eyelet is supported in moving fashion in a fastening opening of the shielding device. The shielding device according to the invention features the fact that the fastening eyelet is supported by a resiliently embodied coupling device so that it is resiliently supported relative to the shielding element in an axial direction and is able to move in the fastening opening relative to the shielding element in at least one radial direction when acted on with friction force and in order to produce friction force, radially outer regions of the coupling device cooperate in a resiliently prestressed fashion with sliding zones on opposite surfaces of the shielding element.

The cooperation of the coupling device with sliding zones on opposite outsides of the shielding element in this case can occur by direct, i.e. immediate, contact. In this context, direct contact is understood to be a touching contact of radially outer regions of the coupling device against the sliding zones. An interposition of a possibly present layer of lubricant is to be understood as an immediate, direct contact, i.e. an immediate, direct cooperation of the invention.

It is also possible to have the radially outer regions of the coupling device cooperate in a resiliently prestressed fashion with the sliding zones on opposite outsides of the shielding element, with the interposition of an intermediate layer, i.e. indirectly. The intermediate layer in this case is embodied so that a direct, immediate contact of the coupling device with the sliding zones does not occur. An example of such an intermediate layer is, for example, a foil-like metal disk, which is situated between the coupling device and the sliding zones on opposite outsides of the shielding element.

In a particularly preferred embodiment, the coupling device is composed of two spring washers that are supported with the radially inner ends of spring arms in a groove of the fastening eyelet. The fastening eyelet is preferably equipped with a radially extending circumferential groove for this purpose.

In another embodiment of the shielding device, the sliding zones are composed of raised regions of the outsides of the shielding element in the vicinity of the fastening openings. Thanks to the embodiment of the sliding zones in the form of raised regions in the immediate vicinity around the fastening openings, the components of the coupling device do not rest against the entire surface, but instead rest against the outside of the shielding element only in a locally delimited fashion. On the one hand, this reduction in the contact area achieves a reduced thermal transmission from the shielding plate into the coupling device and thus into the fastening eyelet and the counterpart fastening piece. On the other hand, the shape of the raised regions—for example in the form of essentially crenellation-shaped bosses or in the form of essentially dome-shaped bosses—can be used to influence the heat-transmitting contact area between the shielding element and the coupling device. This can also be used to influence the heat transmission between the shielding element and the coupling device.

In a particular embodiment of the invention, the fastening opening is an oblong hole in which the fastening eyelet is supported so that it is able to move in at least one radial direction while preferably being unable to move or only able to move to an insignificant degree in a radial direction perpendicular thereto.

According to another embodiment, the spring washers are equipped with rings extending radially around the outside to form the coupling device; in the assembled state, the radially outer rings rest against the sliding zones, i.e. on the raised regions of the shielding element for example, and therefore hold the shielding element relative to the fastening eyelet like a spring-prestressed pair of tongs.

In a particular embodiment of the invention, an intermediate layer is situated between at least one outer region of the coupling device and the sliding zone of the opposite outside of the shielding element. In particular, the intermediate layer is situated between at least one of the spring washers and the corresponding outside of the shielding element. The use of an intermediate layer significantly reduces the wear produced by the friction force, in particular the wear on the shielding element. This is because the intermediate layer provides a larger contact area relative to the shielding element, which reduces the effect of the spring force exerted on the shielding element by the coupling device and thus reduces the wear.

Preferably, the intermediate layer is comprised of a circular, disk-like, in particular ring-shaped, particularly preferably circular ring-shaped intermediate element. This intermediate element has an opening that is likewise suited for accommodating the fastening element or allowing it to pass through. It has turned out to be particularly advantageous to use an intermediate layer composed of stainless steel, in particular stainless steel identified by the material number 1.4301 or 1.4310, or spring steel. Especially with a shielding element composed of aluminum, these materials are particularly advantageous with regard to reducing the wear on the shielding element. It is likewise possible to use an intermediate layer composed of other materials or of materials provided with a coating.

The intermediate layer has a thickness d, preferably of $0.01 \text{ mm} \leq d \leq 0.5 \text{ mm}$ and particularly preferably, of $0.05 \text{ mm} \leq d \leq 0.1 \text{ mm}$. It has turned out that foil-like intermediate elements of such small thicknesses ($0.05 \text{ mm} \leq d \leq 0.1 \text{ mm}$) are sufficient to produce an effective reduction in the wear on the shielding part.

The intermediate element is preferably used when the sliding zone is composed of raised regions of the outsides of the shielding element. It is particularly advantageous to use one intermediate layer per spring washer since this reduces the wear on both outsides of the shielding part.

In a particularly advantageous modification, in addition or as an alternative to the intermediate layer, an anti-friction coating is provided on the outside of the shielding element and/or on the intermediate layer and/or on the spring washers in order to reduce friction-induced wear. This anti-friction coating is preferably an $MoS_2$ coating. It is likewise possible, however, to use graphite or other lubricating materials.

According to another embodiment, an axial distance a between two for example adjacent raised regions that constitute sliding zones is different at different fastening points of the shielding element. It is thus possible, in a particularly simple way, to correspondingly design and individually orient the geometry of the shielding plate in relation to the oscillatory and thermal strain situation at the individual fastening point in question. A different axial distance a at one fastening point as compared to another fastening point can thus be used to achieve an increased spring prestressing force at the one fastening point as compared to the other fastening point. It is nonetheless naturally also possible to provide raised areas with different distances a at one and the same fastening point in order to produce, for example, a coupling device that is prestressed differently in the circumference direction of a fastening point. This makes it possible, for example, to achieve an axial mobility in a direction with an increased spring prestressing force, i.e. with an increased resulting friction force, whereas a lower or higher friction force level can be set in another radial direction.

Naturally, this can also be achieved with a distance a that remains the same in the circumference direction around a fastening point, through a different design or geometric three-dimensional shape or spring stiffness of the spring elements.

The fastening eyelet is advantageously split and composed of at least two ring elements that are joined to each other by caulking.

In order to achieve a definite position of the fastening eyelet relative to the shielding element, it is advantageous if the spring arms of the spring washers extend inward from the radially outer ring and touch one another at the ends, particularly inside the groove of the fastening eyelet.

In this connection, it is particularly advantageous that the spring arms rest against defining edges, in particular radially outer defining edges, of the groove so that the fastening eyelet is supported without play, in particular without rattling, inside the shielding element.

The fastening eyelet is advantageously situated in the vicinity of the fastening opening, approximately in the plane of the shielding element; two identical spring washers can be used to form the coupling element.

Naturally, it is also possible for the fastening eyelet to be situated offset from the shielding element. This then requires the use of two different spring elements that can, for example, also have a three-dimensional form that is stepped in cross-section.

To permit the shielding device and in particular the fastening device for the shielding device to be individually adapted to the oscillatory and thermal strain conditions at the respective fastening point, it is advantageous to optionally embody the spring washers for forming the coupling element differently with regard to its three-dimensional shape, in particular with regard to the geometry of the spring arms and also with regard to the material thickness, spring stiffness, and/or length of the spring arms in order—as mentioned above—to permit the desired variability and flexibility for producing a fastening point that is adapted to an oscillatory and/or thermal strain pattern.

In addition, this measure also makes it possible, for example, for the axially resilient support and/or axially resilient flexibility of the fastening eyelet relative to the shielding element to be embodied as stiffer in one direction and more flexible in the opposite direction.

In order to adapt the shielding device according to the invention to application-specific mechanical and/or thermal stress situations, it is advantageous to adapt the three-dimensional shape and/or the dimension a for the sliding zones as a function of an oscillation analysis/thermal strain analysis at the respective fastening point. Such an oscillation analysis can, for example, be carried out by means of a computer-aided simulation. The same also applies essentially to the thermal strains to be expected.

For the shielding element, it has turned out to be advantageous to use shielding plates composed for example of aluminum or steel that can be embodied as single-layered or multi-layered as needed.

Essential advantages of the invention include the fact that the support of the fastening eyelet relative to the shielding element in a prestressed, resilient fashion in the axial direction and in a way that that is acted on with a friction force in one or more radial directions affords greater degrees of design freedom, thus permitting the shielding element to be simply adapted to different strain scenarios.

It is also advantageous that when the fastening eyelet is moved in the radial direction in the fastening opening, this can always occur with a constant or virtually constant force, whereas with the embodiment according to the prior art, which uses a wire mesh, the movement of the eyelet produces an elastic compression of the wire mesh so that the force to be overcome increases continuously as the fastening eyelet is moved farther from the zero position.

Another significant advantage of the invention is the fact that simple standard components (spring washers with spring arms that project radially inward) and simple turned or stamped parts can be used to produce a fastening point according to the invention. This reduces the cost for logistics, storage, and the like.

As described above, another significant advantage of the invention is the fact that through simple geometric adaptation, for example of the sliding zones (in particular their distance a from one another), it is possible to achieve different spring prestressing forces for the coupling devices, thus offering a broad selection range for the suspension stiffness of the fastening eyelet relative to the shielding plate.

Another advantage is the fact that the shielding arrangement according to the invention can be preassembled with regard to its fastening points already during the manufacturing phase so that the components of the elastically and/or movably suspended fastening eyelets can no longer get lost. Even when a shielding device according to the invention is disassembled, e.g. for maintenance and repair purposes, there is no danger of losing the individual parts of the fastening points.

Furthermore, the shielding arrangement according to the invention makes it easily possible to support fastening eyelets in relation to oblong holes in the shielding element, thus permitting better adaptation to assembly tolerances, for example of counterpart fastening pieces. The support of the fastening eyelet according to the invention within the shielding element, in either an oblong hole or an enlarged round hole, permits the fastening eyelet to be supported in a way that allows it to be moved within a broad range with exertion of a constant force.

An example of the invention will be explained in greater detail below in conjunction with the drawings.

DETAILED DESCRIPTION OF THE PREFERRED EMBODIMENTS

A shielding device 1 according to the invention (FIG. 1) has a shielding element 2, e.g. a thermal and/or acoustic shielding element. In a fastening opening 3 of the shielding element 2, a fastening eyelet 4 is provided, which is mechanically coupled to the shielding element 2 by means of the coupling device 5.

Figure 1:
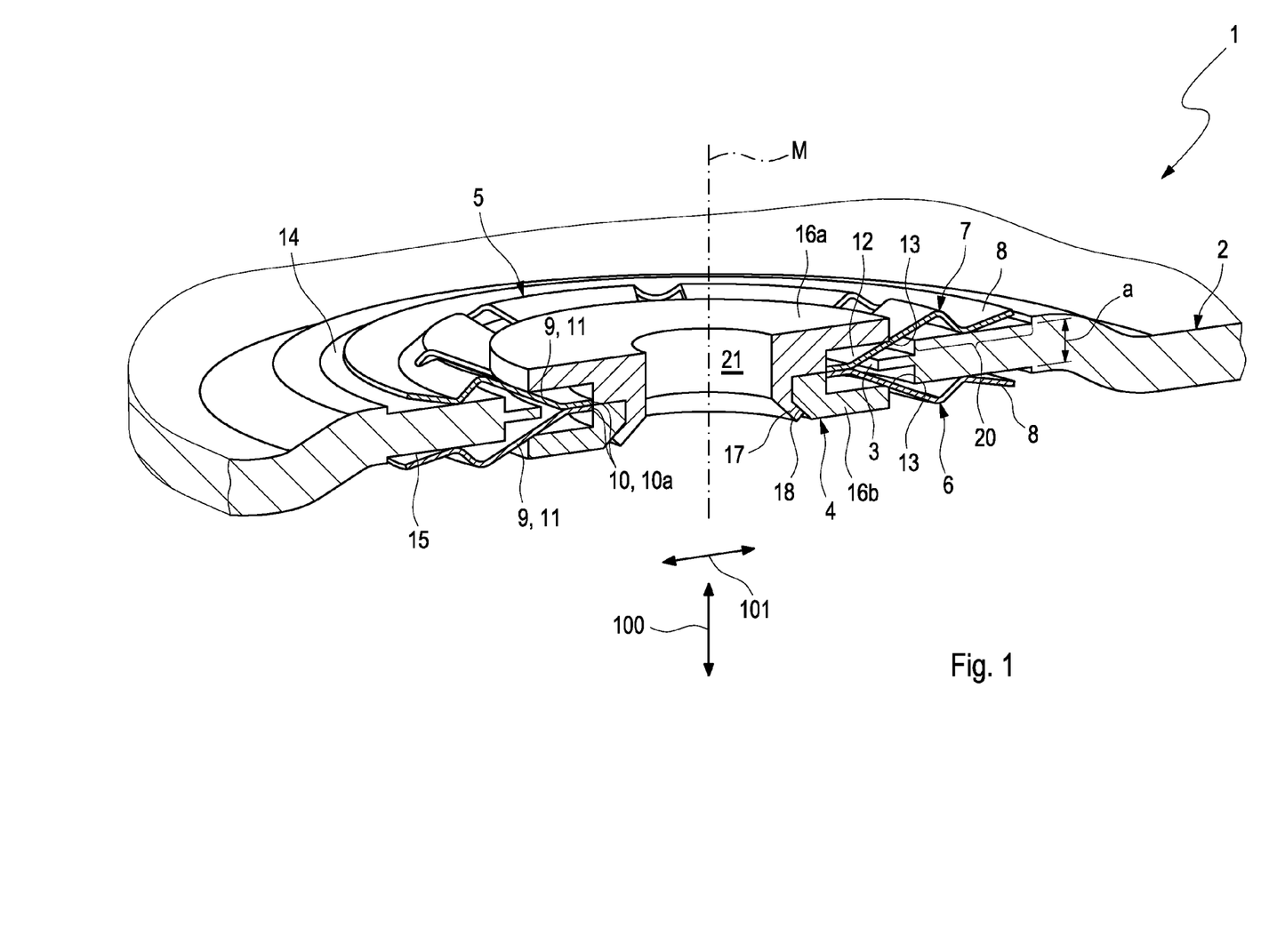
FIG. 1 is a perspective, sectional view of a fastening device with a fastening eyelet of an embodiment of the shielding device according to the invention.

The coupling device 5 has a first spring washer 6 and second spring washer 7. The first spring washer 6 and second spring washer 7 each have a radially outer circumferential spring ring 8 from which a multitude of spring arms 9 extend, oriented radially inward toward a center axis M. The spring arms 9 each have a free end 10a at their radially inner ends 10. At least the free ends 10a of the spring washers 6, 7 touch one another in the region of their respective radially inner ends 10. Spring arm elements 11 connect the free ends 10a of the spring arms 9 to the respective spring ring 8 of the first or second spring washer 6, 7.

The free ends 10a and also at least part of the spring arm elements 11 are positioned inside a radial groove 12 of the fastening eyelet 4.

The radial groove 12 has groove edges 13, which delimit the groove 12 circumferentially. The spring arm elements 11, preferably in a region approximately in the middle of their radial span, touch the groove edges 13 and are supported there. The spring rings 8 of the spring washer 6 and spring washer 7 rest against a first outer surface 14 and second outer surface 15, respectively, of the shielding element 2 and are supported against these outer surfaces 14, 15 either over their entire area or with a linear contact, as shown in FIG. 1.

The support regions of the spring rings 8 against the first outer surface 14 and the second outer surface 15 are spaced apart from one another by a distance a and thus produce a prestressing of the spring washers, which are supported against the outer surfaces 14, 15 at one end and at the other end, are supported against each other at the radially inner ends 10 while resting against the edges 13 of the groove in the region of the spring arm elements 11. Such a support of the fastening eyelet 4 produces a support that is spring-prestressed in an axial direction 100 and is acted on by a friction force in a radial direction 101. The friction force action on the movable support of the fastening eyelet 4 in the radial direction 101 is exerted by a friction force that is produced between the spring rings 8 and the outer surfaces 14 and 15, respectively.

The fastening eyelet 4 in the exemplary embodiment according to FIG. 1 is composed of two ring elements 16a, 16b that delimit the groove 12 extending around their radially outer circumference. The ring element 16a has a caulking collar 17, which in the assembled state, is folded over onto a bevel 18 in a plastically deformed fashion and is thus caulked in position.

In the exemplary embodiment according to FIG. 1, the outer surfaces 14, 15 constitute sliding zones 20 along which the radially outer spring rings of the spring washers 6, 7 can slide in the radial direction 101.

In the present case, the fastening opening 3 is a round hole whose diameter is calibrated so that the fastening eyelet 4 is supported in a way that permits it to move in the radial direction, for example by approx. +/−1.5 mm in all radial directions 101. Conventional fastening elements for fastening the shielding device 1 by means of the fastening eyelet 4 include, for example screws of the M6 size, which are inserted through the hole 21 of the fastening eyelet 4 provided for this purpose and can be screwed into a counterpart fastening piece (not shown).

Naturally, it is also possible to embody the fastening opening 3 in the form of an oblong hole so that in a preferred radial direction 101, a larger movement is possible than in a radial direction perpendicular to the preferred radial direction 101.

With the invention, it is particularly advantageous that the spring rings 8 of the spring washers 6, 7 can slide against the sliding zones either over their entire area or with a linear contact and as a result, fix the fastening eyelet 4 in position relative to the shielding element 2 like a pair of tongs. The fixing action occurs in a spring-prestressed fashion in a direction perpendicular to the outer surfaces 14, 15, thus producing a friction force that is constant or almost constant within the desired movement range of the fastening eyelet 4.

The fastening eyelet 4 can be moved slightly relative to the shielding element 2 in an elastic fashion in an axial direction 100; in a depiction according to FIG. 1, a movement of the fastening eyelet 4 upward in the axial direction 100 results in a more intense spring-prestressing or distortion of the first spring washer 6 and to a temporary relief of the stress on the second spring washer 7.

The entire fastening device, composed of the fastening eyelet 4, the coupling device 5, and the sliding zones 20, in particular their distance a, is advantageously designed so that the fastening eyelet 4 is supported without play, i.e. in a spring-prestressed fashion in any case, in both the axial direction 100 and in the radial direction 101. This reliably prevents rattling noise.

The shielding element 2 is shown in very schematic form in FIG. 1. The description below will explain, in connection with FIG. 2 and in connection with FIGS. 3 and 3a, how the distance a can be preset as needed.

Figure 2:
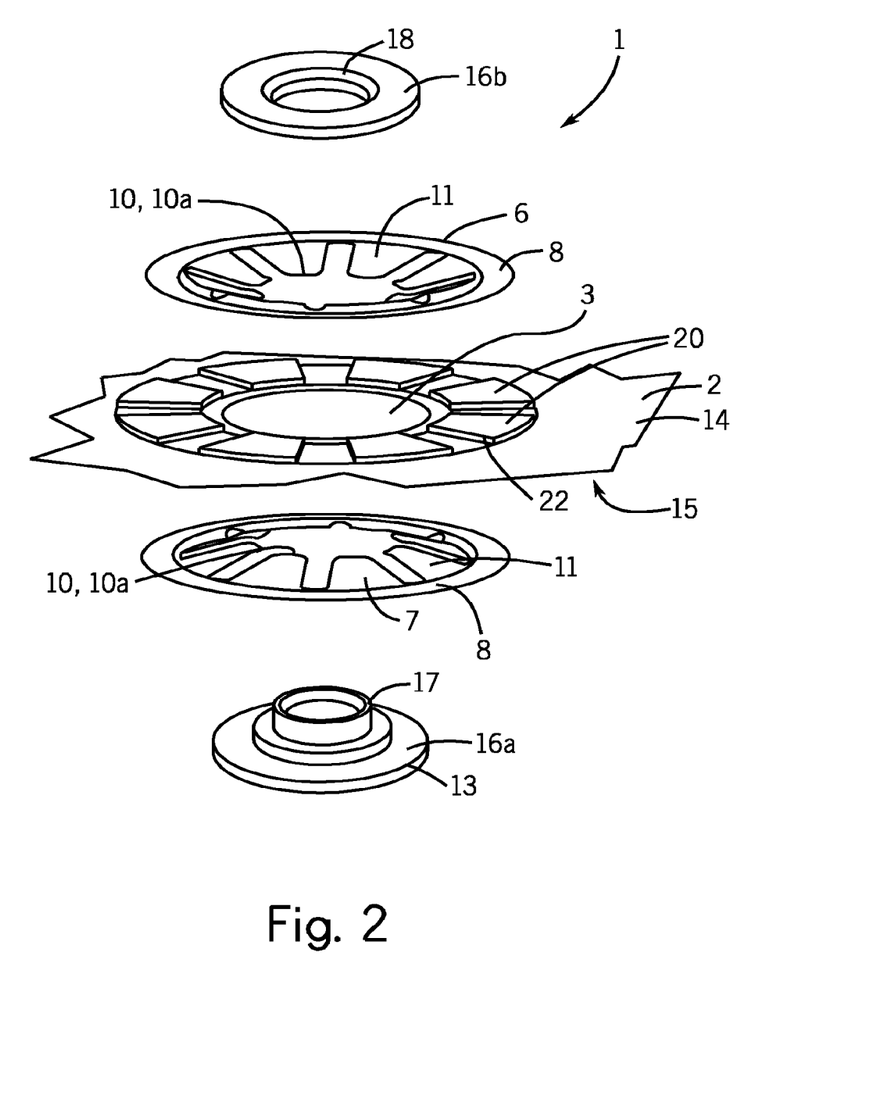
FIG. 2 is an exploded depiction of a fastening device from FIG. 1.

FIG. 2 is an exploded depiction of part of the shielding device 1 according to the invention. In the region surrounding the fastening opening 3, the shielding element 2 has hump-shaped bosses 23 surrounding the fastening opening 3, which are embodied as protruding out from the sheet metal plane of the shielding element 2, for example toward the first outer surface 14 and second outer surface 15 in alternating fashion. This produces sliding zones 20 that are distributed around the circumference and protrude slightly from the first outer surface 14 and from the second outer surface 15 on the opposite side. These sliding zones 20 serve to support the spring rings 8 of the first spring washer 6 and second spring washer 7. This makes it possible in a particularly simple fashion to increase the effective distance a that prestresses the spring washers 6, 7, for example with a one-layered, particularly thin shielding element 2 that is composed, for example, of an aluminum sheet 0.3 mm to 1.5 mm thick. Conventional values for the distance a are for example 1.5 mm to 3.5 mm; these dimensions can be adapted over a broad range depending on the intended use and the type of desired spring prestressing. The invention can also be advantageously used with two-layered or multilayered shielding devices, with possible sheet/film thicknesses of as low as 0.1 mm per individual layer.

Figure 3:
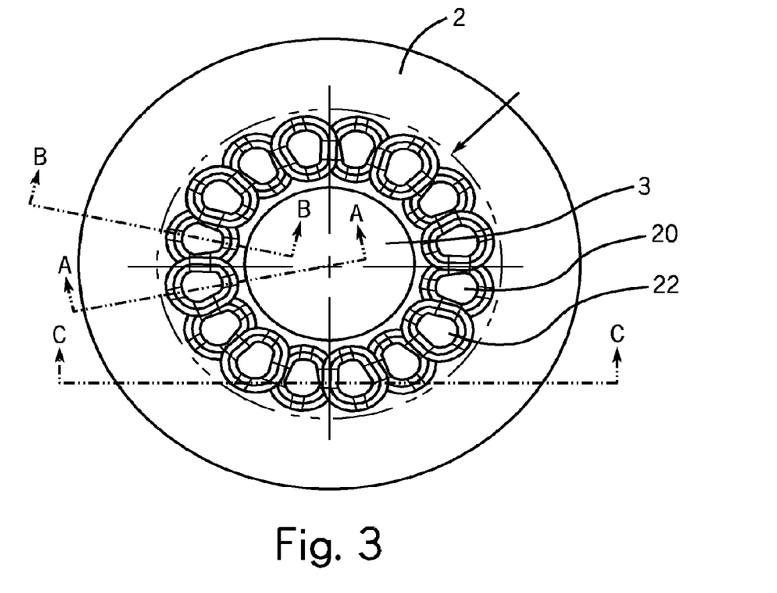
FIG. 3 is a top view of a possible embodiment of the region surrounding a fastening opening of a shielding element of a shielding device according to the invention.
Figure 3A:
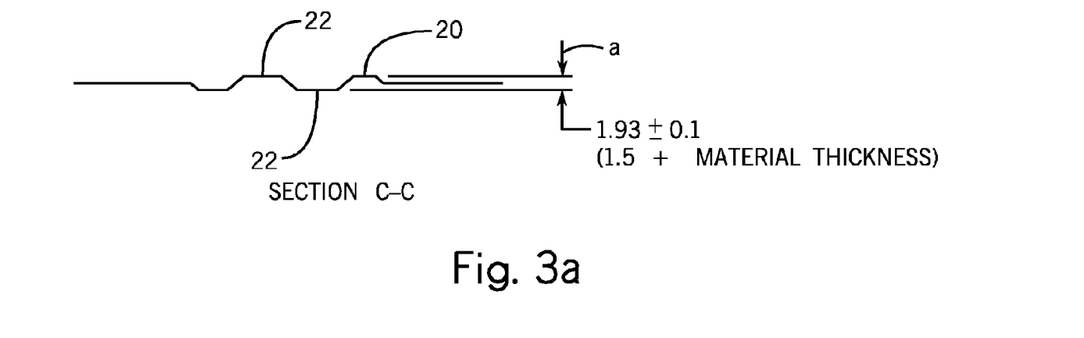
FIG. 3a shows a section along the line C-C from FIG. 3.

The bosses 22, 23 can, for example, be hump-shaped as shown in FIG. 2 or also knob-shaped as shown in FIG. 3. In addition, the sliding zones 20 can be small flat supporting surfaces on the bosses 22, 23, as shown in FIGS. 2 and 3. It is nevertheless also possible to embody the bosses 22, 23 as dome-shaped, forming arched supporting surfaces for the spring washers 6, 7. This yields a support of the spring rings 8 only defined points on the dome-shaped bosses 22 so that only a small amount of thermal transmission from the shielding plate 2 into the fastening eyelet 4 takes place via the coupling device 5.

The provision of bosses 22, 23—whether hump-shaped, dome-shaped, crenellation-shaped, or the like—has the advantage of locally stiffening the region surrounding the fastelling opening 3. This achieves an increased oscillation resistance and reliably prevents the formation of cracks in the material of the shielding element 2 in the immediate region surrounding the fastening eyelet 4. In addition, the device according to the invention protects the shielding element 2 from the overall pressing force that is required for screwing the fastening eyelet 4 to the counterpart fastening piece. This reliably prevents a mechanical overloading of the shielding element 2 in the vicinity of the fastening opening 3, even with the exertion of an incorrect tightening torque, for example of the kind that can occur in everyday workshop situations such as repairs.

As a result, with the shielding device according to the invention, which is equipped with the fastening device according to the invention, a shielding arrangement is achieved that is able to withstand powerful mechanical stresses, in particular oscillation stresses, and due to the resiliently prestressed support of the fastening eyelet 4, is embodied as rattle-free and in fact remains rattle-free over the long term.

The oscillating support of the shielding element 2 relative to the counterpart fastening piece (not shown) significantly reduces the noise level that could occur, for example, due to natural oscillations of a rigidly fastened shielding element.

In addition, the design freedom in laying out the fastening embodiment is achieved because in particular, a selection of suitable spring discs and/or a suitable selection of the geometry of the shielding element in the region of the fastening opening ensure(s) a large amount of design freedom.

The shielding device according to the invention is also reasonably priced and in particular, can be manufactured out of easy-to-produce parts that are available in large quantities.

In another embodiment of the invention, the oscillatory design of the spring washers 6 and 7 or of the geometries of the sliding zones 20 can also be used to adjust a fastening point-specific oscillation and thermal transmission behavior. A plurality of differently designed fastening points can be implemented within a single shielding device 1. It is thus possible, for example, to embody one fastening point with a higher amount of spring prestressing and to embody a second fastening point with a lower amount of spring prestressing, thus permitting them to be optimally adapted to the locally occurring oscillation stresses. In the embodiment according to FIG. 1, a linear contact occurs between the spring washers 6, 7 and the sliding zones 20. Such a linear contact or a contact at specific points as described above significantly reduces the thermal transmission from the shielding element 2 to the fastening eyelet 4.

Another significant advantage of the invention is the fact that the fastening eyelet 4 can be moved relative to the shielding element 2 with a slight, in particular definite, moving force that is constant or virtually constant within the movement range. Another advantage is the fact that the region surrounding the fastening opening has an increased rigidity particularly in the embodiment in which it is provided with bosses 22.

In particular, it has turned out that in shielding elements 2 composed of aluminum sheets, the proposed design principle can be used to attach the fastening eyelet 4 to the shielding element 2 in a particularly advantageous way since it significantly reduces the risk of crack formation. Naturally, however, it is also possible to embody shielding elements 2 out of steel and also to use single-layered or multilayered shielding plates. In this connection, it can be useful to provide an insulating material such as a textile between two shielding element layers. The insulating material layer is preferably cut out in the region surrounding the fastening opening in which the bosses are situated.

Figure 4:
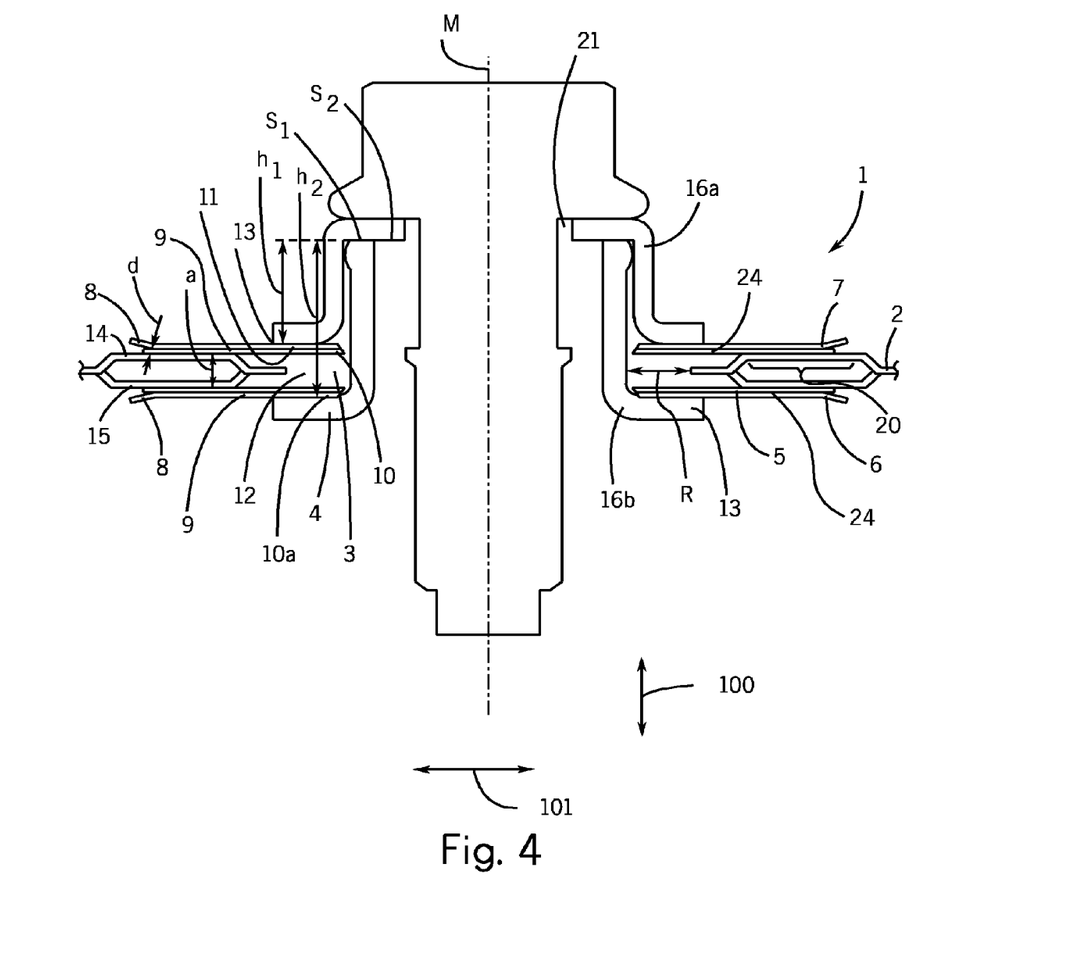
FIG. 4 is a sectional side view of another embodiment of the shielding device according to the invention.

FIG. 4 shows another embodiment of the shielding device according to the invention. This embodiment, too, has a shielding element 2. A fastening opening 3 of the shielding element 2 contains a fastening eyelet 4. The fastening eyelet 4 is composed of two ring elements 16a, 16b, which in this embodiment are embodied as cup-like. In particular, the ring element 16a has an S-shaped cross-section and the ring element 16b has an L-shaped cross-section. This embodiment of the ring elements 16a, 16b is independent of all other features and could therefore also be used instead of the embodiment of the ring elements 16a, 16b shown in FIG. 1.

The one ring element 16a, which accommodates the other ring element 16b when used as intended, has a first height $h_1$, measured between the surface against which a second spring washer 7 rests when used as intended and a second end face $S_2$ against which a first end face $S_1$ of the ring element 16b rests when used as intended. The ring element 16b has a second height $h_2$, measured between the surface against which a first spring washer 6 rests when used as intended and the first end face $S_1$.

When used as intended, the end faces S1 and S2 rest against each other in the axial direction due to the force exerted by the screw and the ring elements 16a, 16b reach the end of their compression in the axial direction 100. The difference between the heights $h_1$ and $h_2$ therefore directly determines the spring force exerted by the spring washers 6, 7, making it possible to vary the spring force by adapting the heights $h_1$ and/or $h_2$. The two ring elements 16a, 16b can, for example, be connected to each other by means of a snap connection or a clamping action.

The spring washers 6, 7 of the embodiment shown in FIG. 4 likewise differ from the spring washers 6, 7 shown in FIG. 1. It would also be possible, however, to use the spring washers 6, 7 shown in FIG. 4 in the embodiment in FIG. 1 instead of the ones shown there. The embodiment of the spring washers 6, 7 is independent of the other features of the shielding device according to the invention.

The spring washers 6, 7 of the embodiment according to FIG. 4, which together constitute the coupling device 5 of this embodiment, have a radially outer circumferential spring washer 8, from which a multitude of spring arms 9 extend, which are oriented radially inward toward a center axis M. In the embodiment according to FIG. 4, the free ends 10a of the spring washers 6, 7 do not touch one another in the assembled state. Instead, the free ends 10 of the spring washers 6, 7 are spaced apart from one another. The spring washers 6, 7 of the embodiment shown in FIG. 4 are embodied as significantly flatter than the spring washers 6, 7 of the embodiment shown in FIG. 1.

Between the first spring washer 6 and the sliding zone 20 of the second outer surface 15, an intermediate layer is provided, which in this embodiment is embodied as an essentially ring-shaped intermediate element 24. Another intermediate element 24 is provided between the second spring washer 7 and the sliding zone 20 of the first outer surface 14.

The embodiment shown in FIG. 1 could also be provided with an intermediate layer, in particular an intermediate element 24; in this case, the inner diameter $D_1$ of a ring-shaped intermediate element 24 would then have to be selected to be significantly larger than the diameter $D_2$ of the fastening opening 3 since the intermediate element 24 advantageously should not reach in the radial direction toward the center axis M to the point at which the spring washers 6, 7 touch.

In a zero position in which the ring elements 16a, 16b, the spring washers 6, 7, the intermediate elements 24, and the fastening opening 3 are arranged concentrically, the fastening eyelet 4 has a radial play R in the radial direction 101, which is determined by the difference between the diameter $D_2$ of the fastening opening 3 and the outer diameter $D_3$ of the ring element 16b. Preferably, the diameter $D_2$ of the fastening opening 3 is selected so that the shielding elements 2 and the ring elements 16a, 16b overlap in the radial direction 101 in the zero position. The expansion of the sliding zones 20 in the radial direction 101, based on the contact point of the spring washers 6, 7 in the sliding zone 20 in the zero position, corresponds at least to the radial play R both toward the center axis M and away from it. When used as intended, the fastening eyelet 4 can move relative to the shielding elements 2 far enough that the edge of the shielding elements 2 oriented toward the center axis comes to rest against the ring element 16b. The spring washers 6, 7 and the intermediate elements 24 have then correspondingly slid in the sliding zones 20, which is why the above-described embodiment of the sliding zones 20 is advantageous so that it is possible to prevent the spring washers 6, 7 and/or the intermediate elements 24 from sliding off of the sliding zones 20.

Figure 5:
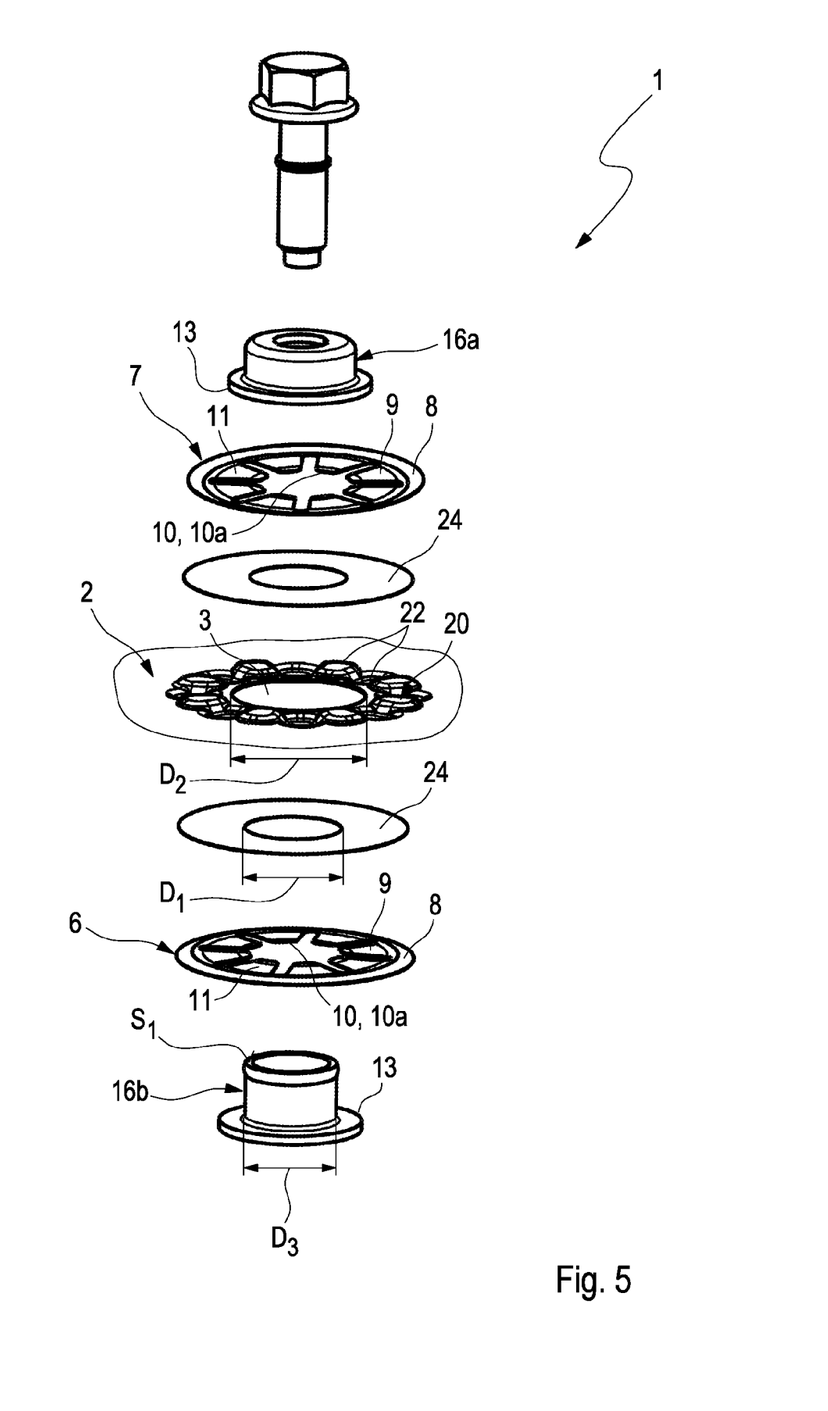
FIG. 5 is an exploded depiction of the embodiment from FIG. 4 in a perspective view.

FIG. 5 is an exploded depiction of the combination composed of the shielding element 2, intermediate elements 24, spring washers 6, 7, and ring elements 16a, 16b as well as a screw by means of which the shielding device 1 can be fastened to a counterpart fastening piece (not shown). The shielding element 2 is provided with raised regions in the vicinity of the fastening opening 3 that constitute sliding zones 20. The spring washers 6, 7 cooperate with the sliding zones 20 by means of the intermediate elements 24 and thus generate a friction force.

The invention claimed is:

1. A shielding device, comprising:
a shielding element having a fastening opening extending therethrough between opposing sides of the shielding element, and each opposing side having a sliding zone comprising a plurality of circumferentially-offset raised bosses in a vicinity of the fastening opening; and
a fastening eyelet for fastening the shielding device to a counterpart fastening piece, the fastening eyelet having an axial hole defining a central axis for receiving a fastening element and having an annular groove extending around an outer periphery of the fastening element, and wherein the fastening eyelet is movably supported in the fastening opening of the shielding device;
a resiliently embodied coupling device comprising two spring washers, each washer comprising a spring ring having a plurality of radially-inwardly extending spring arms, the washers being supported with radially inner ends of spring arms in the annular groove of the fastening eyelet and with each spring ring engaging a respective opposing side of the shielding element and being resiliently-biased towards the other spring ring by the spring arms, wherein the coupling device resiliently supports the fastening eyelet relative to the shielding element in an axial direction and the fastening eyelet is movable in the fastening opening relative to the shielding element in at least one radial direction when acted on with friction force;
wherein to produce friction force, the spring rings cooperate in a resiliently prestressed fashion with the sliding zones of the opposing sides of the shielding element such that the spring rings rest against, either directly or indirectly, and can slide in a radial direction along the raised bosses and hold the shielding element like a spring-prestressed pair of tongs.

2. The shielding device as recited in claim 1, wherein the spring rings cooperate with the sliding zones on the opposing sides of the shielding element via direct contact with each other or indirectly via at least one intermediate layer.

3. The shielding device as recited in claim 2, wherein an anti-friction coating comprising MoS2 is provided on the opposing sides of the shielding element and/or on the spring washers.

4. The shielding device as recited in claim 1, wherein the raised bosses are essentially crenellation-shaped.

5. The shielding device as recited in claim 1, wherein the raised bosses are dome-shaped.

6. The shielding device as recited in claim 1, wherein the fastening opening is an oblong hole n which the fastening eyelet is supported so that the fastening eyelet is movable in at least one radial direction.

7. The shielding device as recited in claim 1, wherein three-dimensional forms of the raised bosses are different axial distances from different fastening points of the shielding element.

8. The shielding device as recited in claim 7, wherein the three-dimensional shape and/or axial distance of the raised bosses is/are adapted to specific temperature and oscillation stresses at the fastening point.

9. The shielding device as recited in claim 1, wherein the fastening eyelet comprises at least two ring elements that are joined to each other by caulking.

10. The shielding device as recited in claim 1, wherein the spring arms extend inward from the radially outer spring rings and touch one another at the radially inner ends.

11. The shielding device as recited in claim 1, wherein the spring anus rest against defining edges of the groove.

12. The shielding device as recited in claim 1, wherein the fastening eyelet is situated in a vicinity of the fastening opening, approximately in a plane of the shielding element and two identical spring washers are used to form the coupling device.

13. The shielding device as recited in claim 1, wherein in order to form the coupling device, the spring washers are embodied differently with regard to their three-dimensional shape, wherein the spring washers differ with regard to a geometry of the spring arms and also with regard to the material thickness, spring stiffness, and/or length of the spring arms.

14. The shielding device as recited in claim 1, wherein the shielding element is a shielding plate comprising aluminum and/or steel.

15. The shielding device as recited in claim 1, wherein the shielding element is multilayered and comprises a plurality of individual shielding plates.

\* \* \* \* \*